United States Patent [19]
Kita

[11] 3,924,389
[45] Dec. 9, 1975

[54] AUTOMATIC LAWN MOWER

[76] Inventor: Stanley B. Kita, 30 Valley Green Road, Doylestown, Pa. 18901

[22] Filed: Mar. 27, 1973

[21] Appl. No.: 345,307

[52] U.S. Cl.............................. 56/10.2; 56/DIG. 15
[51] Int. Cl.$^2$........................................ A01D 35/262
[58] Field of Search............. 56/10.2, DIG. 15, 11.9; 180/79.1, 96

[56] References Cited
UNITED STATES PATENTS

| 2,751,030 | 6/1956 | Null | 180/79.1 |
| 3,425,197 | 2/1969 | Kita | 56/10.2 |
| 3,443,658 | 5/1969 | Culp | 180/96 |
| 3,550,714 | 12/1970 | Bellinger | 56/10.2 X |
| 3,570,227 | 3/1971 | Bellinger | 56/10.2 |

*Primary Examiner*—J. N. Eskovitz

[57] ABSTRACT

A lawn mower is provided with auto-pilot apparatus which guides the mower automatically along the edge of a swath which has been cut within or around an area of uncut grass. The auto-pilot apparatus includes a sensor assembly mounted on the front of the mower to detect the edge of the swath by sensing the difference in height between uncut grass and the cut grass in the swath. An electrical signal is produced by the sensor assembly when it contacts the uncut grass and passes therethrough a minute electrical current. The current is amplified in a solid-state amplifier circuit in which a pair of clutch-brake assemblies are connected for steering the mower along the edge of the swath in response to electrical signals from the sensors by selectively braking and/or driving the wheels of the mower. A sensor and circuit design is disclosed for guiding the mower accurately along the swath edge with a minimum of hunting even when the grass is damp or growing sparsely. Various safety features are disclosed for stopping the mower in the event that the mower strikes an obstacle or there is a malfunction in the guidance of the mower, and there is provided means to turn the mower off automatically when finished mowing. The mower is capable of being converted readily from automatic to manual operation and vice versa. In addition, a method is disclosed for using the mower in a manner which permits it to avoid obstacles and to use uncut grass and/or an elevated wire as safety barriers.

43 Claims, 18 Drawing Figures

AUTOMATIC LAWN MOWER

The present invention relates to automatic guidance apparatus for vehicles, and more particularly, the present invention relates to auto-pilot apparatus which guides a lawn mower along a swath so that the mower is capable of cutting grass automatically.

BACKGROUND OF THE INVENTION

In my U.S. Pat. No. 3,425,197 there is disclosed apparatus for guiding a lawn mower automatically by enabling the mower to detect and follow the edge of a swath which has been cut manually around an area of uncut grass. In one of the preferred embodiments, the apparatus includes a pair of plate-like sensors mounted side by side on an arm located on the front of the mower, and the sensors are supported sufficiently close to the earth so that, depending on the alignment of the mower that the swath, one, or both, or neither sensor contacts uncut grass. The sensors are connected by an amplifier circuit to steering means which operates to steer the mower. For instance, the mower steers a straight course when the left sensor contacts uncut grass and the right sensor overlies cut grass in the swath. The mower steers away from the uncut grass when both sensors contact uncut grass, and the mower steers toward uncut grass when neither sensor contacts uncut grass.

The steering means steers the mower by braking one wheel and driving the other. For instance, the mower steers to the left when the left wheel is braked and the right wheel rotates, and the mower steers to the right when the right wheel is braked and the left wheel rotates. The left sensor normally contacts the uncut grass and controls the operation of the left wheel, and the right sensor normally overlies the cut grass and controls the operation of the right wheel. Thus, the mower continually turns to the left in search of uncut grass so that when the mower is aligned with the edge of the swath and is placed in its automatic mode and released, the mower follows the pre-established swath and establishes a new guide swath in a slightly smaller pattern each time it completes a trip around the lawn. In this manner, the mower works itself toward the center of the lawn to completely mow the same.

A mower has been constructed according to the teachings of my above patent, and the mower has been tested. Although the mower operates to cut grass automatically, certain limitations have been noticed. For instance, it has been found that operation of the mower over a period of time tends to cause chlorophyll and/or moisture to accumulate on the insulation material which separates the sensors. Such accumulation can cause the mower to steer improperly by producing false steering signals from the sensors unless the insulation material is cleaned periodically. Moreover, when dew is on the grass or when the grass is wet such as after a rain, the moisture on the grass also tends to bridge across the insulation and can cause improper steering.

In my patented apparatus a substantially uniform growth of grass is desired to maintain the desired continuity of contact between the left sensor and the uncut grass to ensure steering of the mower on a straight course. For instance, it has been found that when the swath-edge is not well defined, such as when it traverses bare spots or areas of sparsely-growing grass in a lawn, the left sensor may lose contact with uncut grass to cause the mower to steer leftward and then rightward around the bare of sparse area, thereby producing a jerky motion. In order to maximize the service life of the steering apparatus by minimizing the jerky movement and hence the "hunting" of the mower along the swath, it is desirable for the mower to be capable of steering a straight course even though the left sensor may momentarily lose contact with uncut grass.

It has been observed that when both sensors are out of contact with uncut grass and the right wheel is rotating to steer the mower leftward, movement of the mower may be completely arrested. For instance, if the right sensor contacts an uncut tuft of grass as the mower turns and the sensors swing around, the right wheel brakes. Since the left wheel is also braked, the mower stops. Such operation has been observed particularly when the grass is wet and does not lay flat when cut. An automatic mower which does not possess such proclivity is highly desirable.

The mower disclosed in my above patent does not possess means to turn itself off automatically when finished cutting a plot of grass, and the mower does not possess safety devices to stop it in the event that it contacts an obstacle or in the event of a guidance malfunction or the like. Such features are highly desirable in order to avoid possible injury to bystanders. It is also important for an automatic mower to be readily convertible from the automatic mode and into the manual mode and vice versa so that it may be operated manually with a minimum of effort, and the mower should be capable of operating in such a manner as to avoid obstacles.

With the foregoing in mind, it is a primary object of the present invention to provide an improved automatic lawn mower which is capable of operating safety and efficiently with a minimum of maintenance for prolonged periods of time.

It is another object of the present invention to provide novel sensors and a control circuit for a lawn mower auto-pilot system, whereby a mower is able to guide itself along the edge of a swath with a minimum of hunting.

It is a further object of the present invention to provide means for arresting motion of an automatic lawn mower in the event that it strikes an obstacle, or in the event that there is a malfunction in the guidance of the mower when in the automatic mode.

As still another object, the present invention provides means for automatically turning off an automatic mower when the mower finishes cutting a plot of grass.

It is yet another object of the present invention to provide improved sensors which operate in conjunction with a unique solid state circuit to enable an automatic mower to guide itself accurately along a swath-edge even though the edge may traverse bare spots or areas of sparsely growing grass in a lawn.

As an object, the present invention also provides a novel method of cutting grass with an automatic mower of the type which guides itself along a pre-cut swath so that the mower is capable of avoiding obstacles and of using uncut grass and/or an elevated safety wire as barriers.

SUMMARY OF THE INVENTION

The present invention provides auto-pilot apparatus for guiding a lawn mower accurately and safely along the edge of a pre-cut swath without requiring human supervision after the mower is placed in its automatic mode. The auto-pilot apparatus includes sensor means which operate to detect the edge of the swath by sensing the difference in height between uncut grass and cut grass in the swath. The sensor means includes a pair of sensor-plates which are mounted side by side on the front of the mower and which operate to sense the edge of the swath by passing a minute amount of electrical current through the uncut grass depending on the alignment of the mower with the swath-edge. The sensor-plates are connected in a solid-state amplifier circuit with clutch-brake assemblies which are associated with left and right drive wheels on the mower for steering the mower along the swath by selectively driving and/or braking the wheels in response to signals from the sensor means. The current is amplified in the circuit to activate the left clutch-brake when neither of the sensors contacts uncut grass, to activate the right clutch-brake when both sensors contact uncut grass, and to activate neither clutch-brake when the left sensor contacts uncut grass and the right sensor does not. A layer of electrical insulation overlies each sensor, and the peripheral edges of the sensors are insulated from the mower and from one another by an air gap so that only their undersides contact grass. The sensors are secured to the mower in a manner affording adjustment of the height of the cutting blades of the mower while maintaining the same spacing between the plane of the sensors and the cutting plane of the blades. There is also provided means for mounting the sensors to pivot about a transverse horizontal axis in response to changes in the slope of the ground as the mower advances, so that the leading edges of the sensors are always spaced a proper distance from the ground. Auxiliary sensors are provided to ensure proper guidance of the mower through bare or sparsely growing areas of grass in a lawn and to eliminate cusps which may tend to develop during the course of automatic operation.

The circuit includes means providing a slight time delay between disengagement of the left sensor from uncut grass and the transmission of a left steering signal to the left clutch-brake so that the mower is prevented from steering leftwardly immediately upon momentary disengagement of the left sensor from uncut grass. The circuit also includes a second time delay which is greater than the first-mentioned time delay for turning off the mower if the left sensor is out of contact with uncut grass for more than a predetermined period of time, so that the mower turns itself off automatically after it cuts all the grass in an assigned area and turns leftward for a few turns in search of uncut grass. In addition, the circuit includes means for temporarily locking out operation of the right clutch brake to prevent it from responding to a signal produced by the right sensor when the mower is responding to a steering signal produced by the left sensor. The circuit also includes means for arresting motion of the mower in the event that a malfunction occurs which would cause both of the sensors to contact uncut grass for longer than a predetermined period of time. Safety devices connected in the circuit includes a pressure-sensitive bumper switch which extends around the front of the mower for grounding the engine when the bumper strikes an obstacle and for simultaneously braking both of the driving wheels of the mower for a period of time sufficient to permit the blades of the mower to come to a complete stop. A maximum voltage for the safe operation of the mower and a minimum current which should be passed through the grass in order to ensure satisfactory operation are disclosed.

Selector means is provided to permit the mower to be converted readily from the automatic mode and to the manual mode and vice versa. When in the manual mode, the selector means operates to induce in the circuit a signal corresponding to a straight course signal when in the automatic mode, so that both wheels are driven to afford conventional manual operation. Also, there is provided means for coupling the driving wheels to their associated clutch-brake assemblies so that a different action may be provided when the mower is used in the manual mode.

A method is disclosed for using the mower in a manner which enables it to avoid obstacles such as trees and shrubs and the like and which enables it to use uncut grass as a safety barrier to prevent the mower from straying from a prescribed cutting area. In the method, areas around obstacles are cut before the outer perimeter is cut and the mower placed in its automatic mode. The mower may be used in conjunction with a safety wire surrounding an area to be cut for cutting grass in ever expanding patterns. The safety wire arrests the mower in the event it should stray from its assigned cutting area.

These and other objects, features and advantages of the present invention should become apparent from the following description when taken in conjunction with the accompanying drawings.

DESCRIPTION OF THE PREFERRED EMBODIMENTS

A. The Mower

Figure 1:
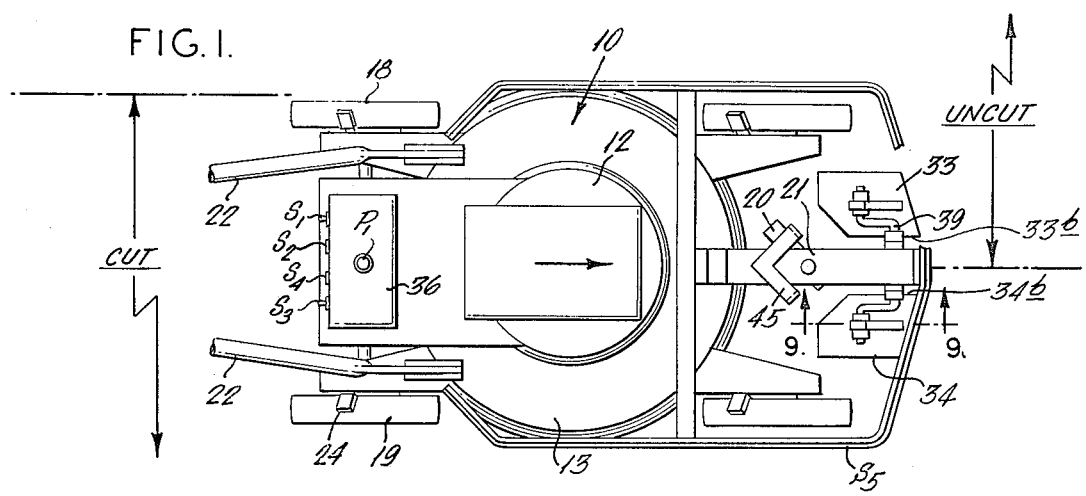
FIG. 1 is a plan view of an automatic mower embodying the present invention.
Figure 2:
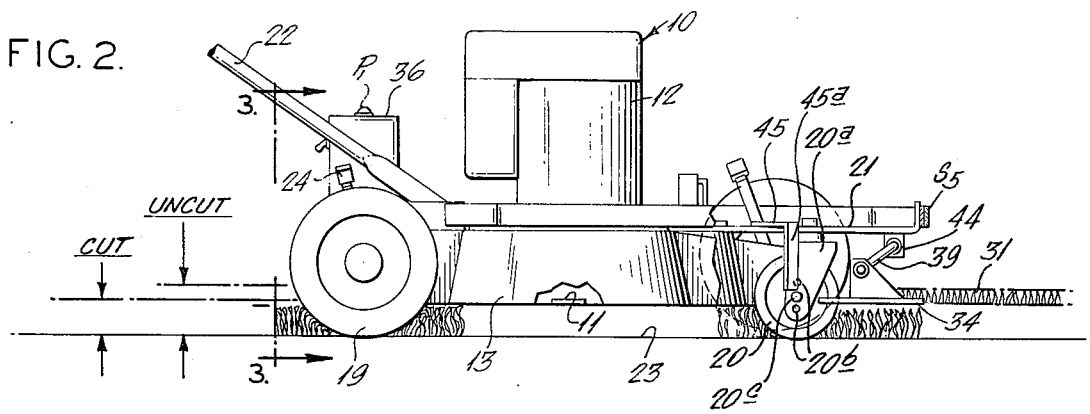
FIG. 2 is a side elevational view of the lawn mower illustrated in FIG. 1.

Referring now to the drawings, there is illustrated in FIG. 1 an automatic lawn mower 10 embodying the present invention. In the present instance, the mower 10 is of the rotary-type, having cutting blades 11 (FIG. 2) which are rotated in a horizontal plane by an internal combustion engine 12 mounted centrally on the frame or deck 13. The engine 12 is connected by a rearwardly-extending belt 14 (FIG. 3) to a transmission 15 mounted centrally at the rear of the mower 10. A conventional control cable (not shown) is connected to the transmission 15 to permit an operator to couple and uncouple a pair of rear drive wheels 18 and 19 with the engine 12 for propelling the mower forwardly. In the present invention, the transmission 15 is connected through clutch-brake assemblies 16 and 17 to the left and right rear drive wheels 18 and 19, respectively, for selectively driving and/or braking the wheels when the mower 10 is in the automatic mode to effect steering along a pre-cut swath. As best seen in FIG. 2, the front of the mower 10 is supported by a caster wheel 20 which is mounted below a forwardly-extending arm 21. The caster wheel 20 permits the mower to pivot about one or the other of the rear wheels 18 or 19 when the left or right drive wheel is braked by its associated clutch-brake assembly. In order to permit the mower 10 to be guided manually in the customary manner to cut the initial guide swath and to trim around obstacles, a conventional handle 22 is provided.

Figure 3:
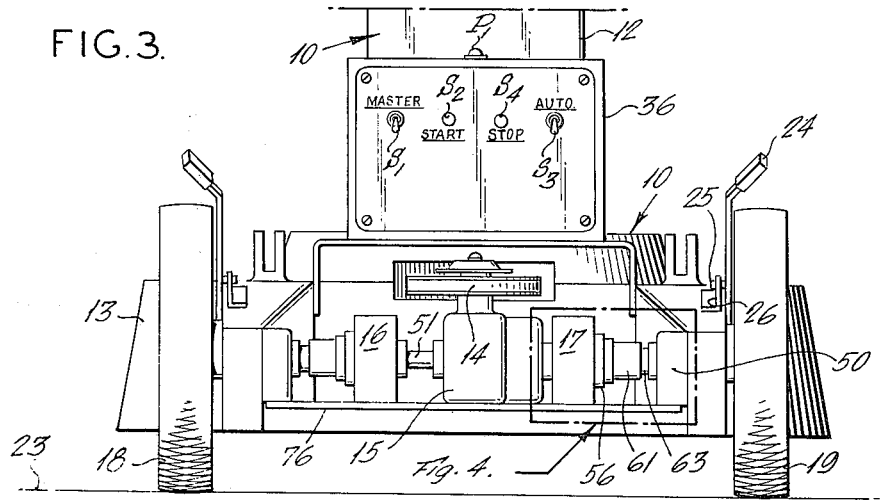
FIG. 3 is an enlarged rear elevational view taken along line 3—3 of FIG. 2 with the handle of the mower removed.

A preferred mower is a 21 inch, rotary, self-propelled mower manufactured by the Jacobsen Manufacturing Company of Racine, Wisconsin. Such a mower includes means for adjusting the height of the deck 13 and hence the height of the cutting blades 11 relative to the ground or supporting surface 23. For instance, as best seen in FIG. 3, each wheel, such as the right rear drive wheel 19, is provided with an upstanding lever 24 having an inwardly-extending pin 25 engageable in one of a series of detents in a clip 26. The axis of rotation of the wheel 19 is offset from the pivot axis of the lever 24 so that the height of the deck 13 relative to the wheel-axis and ground surface 23 is adjusted when the lever 24 is displaced rightward to disengage the pin 25 from its clip 26 and the lever 24 is pivoted in either the clockwise or counterclockwise directions (FIG. 2). It is noted that the caster wheel 20 includes a depending yoke 20a having a series of aligned vertically-spaced holes 20b, 20b in which an axle 20c is removably mounted to permit the elevation of the front of the deck 13 to be adjusted to correspond to the elevation of the rear. Of course, other means may be provided for adjusting the height of the front of the deck 10 so that the cutting plane of the blades 11 is maintained parallel to the ground surface 23. For example, the arm 21 may be releasably fastened to a braket mounted on the front of the deck, and the level of the arm 21 relative to the bracket may be adjusted.

Figure 8:
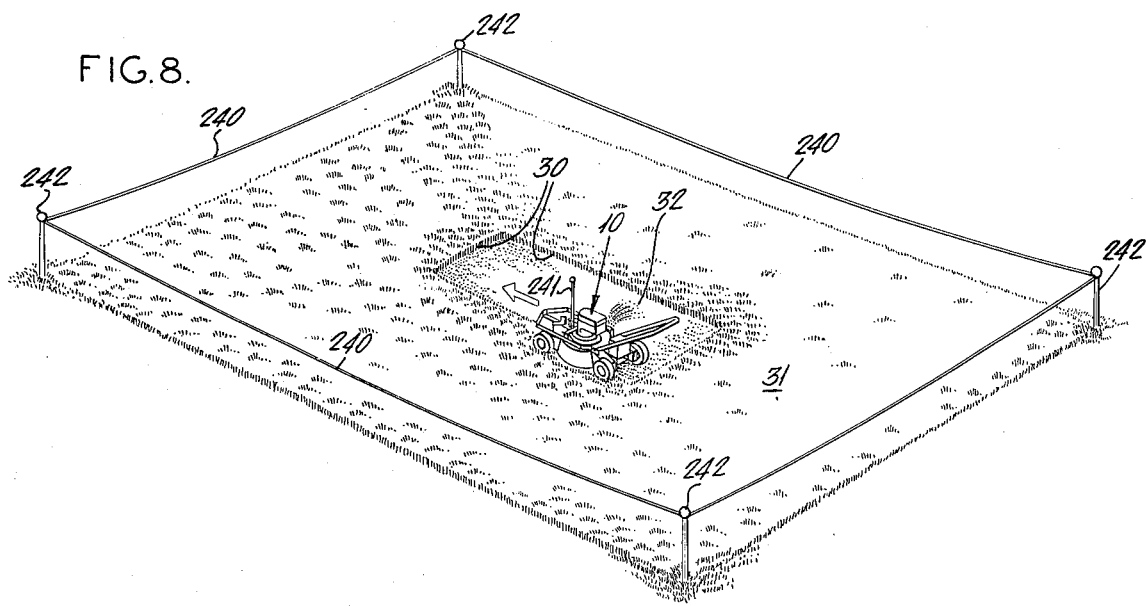
FIG. 8 is a perspective view of a plot of grass enclosed by an elevated safety wire which is adapted to engage an upstanding rod on the mower for stopping the mower when it reaches the perimeter of the area after cutting the grass in outwardly-expanding patterns.

The mower 10 is guided manually around a plot in the customary manner to form a pattern having a continuous edge 30 between an area of uncut grass 31 and a swath of cut grass 32, and in accordance with the present invention auto-pilot apparatus is provided for guiding the mower 10 automatically along the edge 30. In brief, the auto-pilot apparatus detects the difference in height between the uncut grass 31 inside the pattern and the cut grass 32 outside the pattern with a pair of sensors 33 and 34 which operate in conjunction with a circuit 35 (FIG. 15) to actuate the clutch-brake assemblies 16 and 17. The circuit 35 is contained in a control box 36 mounted at the rear of the mower 10 between the wheels 18 and 19, and the circuit 35 is designed so that the left sensor 33 controls the operation of the left clutch-brake 16 and the right sensor 34 controls the operation of the right clutch-brake 17. For example, when the left sensor 33 is contacting uncut grass 31 and the right sensor 34 is overlying and spaced from the cut grass 32, such as indicated in FIGS. 1 and 2, both of the clutch-brakes are de-energized to cause both of the rear wheels 18 and 19 of the mower 10 to be driven. As a result, the mower 10 travels in a straight path. In the event that the swath edge 30 curves to the right as the mower 10 advances forwardly, the straight path of the mower will intersect the curved swath-edge 30, and both sensors 33 and 34 will contact the uncut grass 31 causing the circuit 35 to energize the right clutch-brake assembly 17 for braking the right drive wheel 19 to steer the mower 10 rightward. If the edge 30 curves to the left, both sensors 33 and 34 will lose contact with the uncut grass 31 as the straight path traveled by the mower diverges from the swath edge 30. As a result, the left clutch-brake assembly 16 is energized to steer the mower 10 leftward. Thus, the mower 10 seeks the swath-edge 30 and travels inwardly while cutting grass. It is noted, however, that the mower may be set in a pattern which causes it to travel outwardly while cutting grass, such as illustrated in FIG. 8.

B. The Sensors

Figure 15:
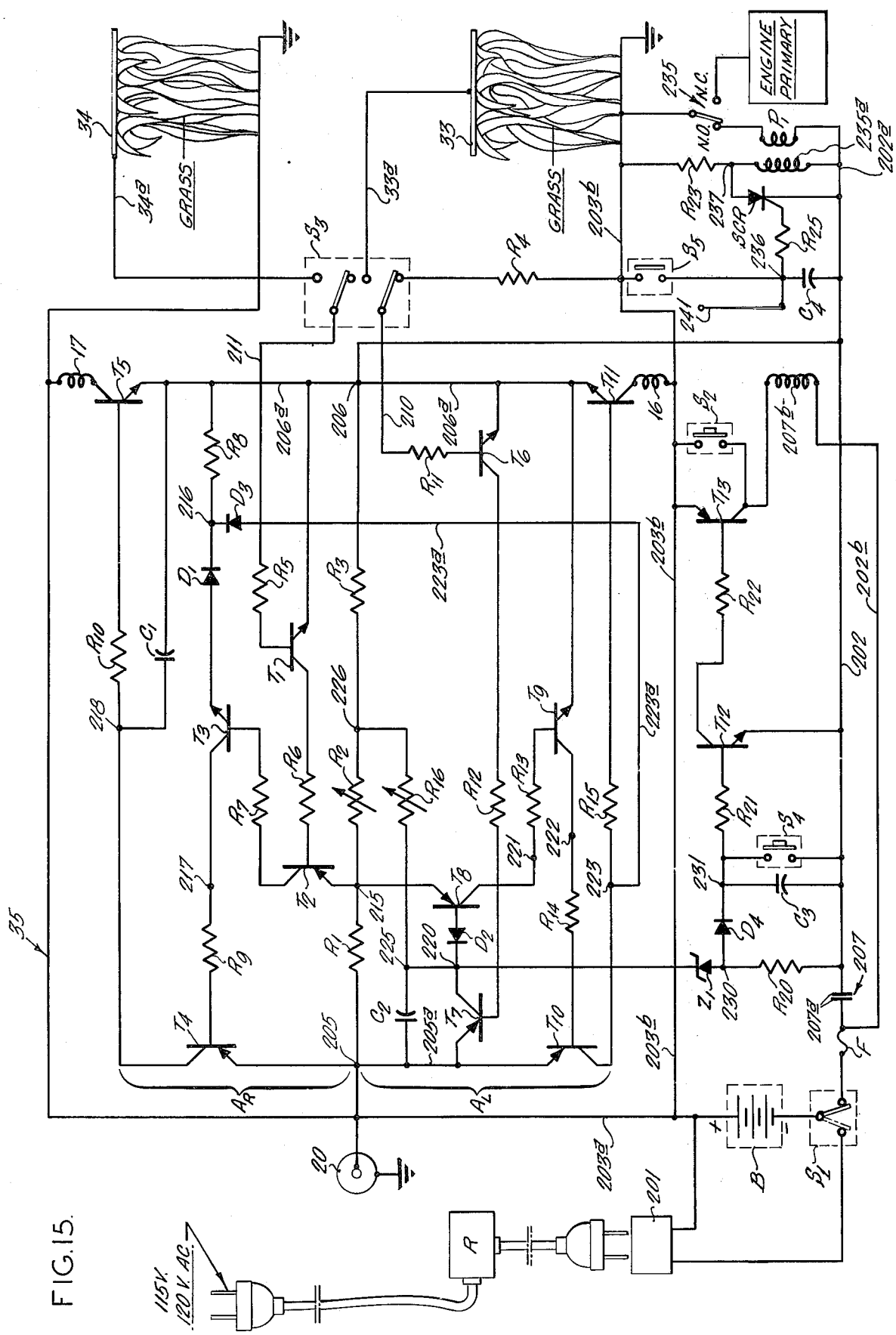
FIG. 15 is a schematic diagram of a circuit in which the sensors and the clutch-brake assemblies are connected to steer the mower automatically along the edge of a swath.

The sensors 33 and 34 detect the edge 30 of the swath by contacting and passing a minute amount of electrical current through the uncut grass 31. For this purpose, an electrical potential is applied between each sensor 33 and 34 and the ground 23. In the present invention, a potential of 12 volts D.C. is applied; however, it should be understood that any voltage below the threshold of pain, which for most people is about 24 volts, may be used safely. As best seen in FIG. 15, the potential is provided by a battery B connected in the circuit 35 and illustrated at the lower left hand corner in FIG. 15. The positive terminal of the battery B is grounded to the deck 13, and the deck 13 is grounded through a conductive member such as the caster wheel 20 which is preferably of metal construction. Thus, the entire mower 10 is at ground potential, and the sensors 33 and 34 are at a different or higher potential. By virtue of this structure, a minute amount of electrical current flows through the uncut grass 31 when engaged between the undersides of the sensors 33 and 34 and ground 23. It is noted that the sensors 33 and 34 are connected in the circuit 35 by shielded leads 33a and 34a, respectively, in order to avoid possible radio interference from the spark plug of the engine 12. Moreover, the leads 33a and 34a are preferably of very light gage wire to minimize temperature effect.

Figure 9:
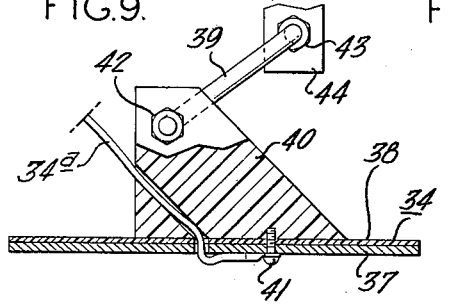
FIG. 9 is an enlarged sectional view taken along line 9—9 of FIG. 1 to illustrate the construction of one of the swath-edge sensors employed in the present invention.

Each sensor, such as the right-hand sensor 34 (FIG. 9) includes a grass-containing conductor 37 on which is superimposed a layer of electrical insulation 38. The insulation 38 is co-extensive in length and breadth with the conductor 37, and preferably the conductor 37 and insulation 38 are laminated together. A laminated structure of the type which is employed in printed circuits has been found to provide a satisfactory sensor structure. As best seen in FIG. 2, the sensor 34 is connected to the arm 21 through a crank or link 39 fastened to an upstanding stanchion 40 which is located on the insulation 38 and which is fabricated of an electrical insulation material such as lexan R. The shielded lead 34a depends through the stanchion 40, the insulation layer 38, and the conductor 37 and is connected to the underside of the conductor 37 by means of a threaded fastener 41.

It is important for the height of the sensors 33 and 34 to be adjustable in order to ensure a proper operating relationship with the uncut grass 31 and the cut grass 32. As an example, if the blades 11 were set to cut grass approximately 4½ inches tall at 2½ inches above the ground 23, the conductor 37 should be spaced between ½ inch and 1 inch above the cutting plane of the blade 11 and above the cut grass 32. Thus, the conductor 37 should be located approximately 3½ inches above the ground 23 and between ½ – 1 inch below the top of the uncut grass 31. To this end, adjustment means is provided including a pair of nuts 42, 42 which engage threaded portions of the crank 39 on opposite sides of the stanchion 40 and a pair of nuts 43, 43 which engage threaded portions on the crank 39 and opposite sides on a depending bracket 44 mounted to the underside of the arm 21. The height of the sensor 34, and hence its conductor 37, may be adjusted by loosening the nuts 42 and 43 and pivoting the crank arm 39 in either the clockwise or counterclockwise directions until the desired height adjustment is effected. Preferably, the conductor 37 is flat and is disposed horizontally and substantially parallel with the ground 23 at the above-noted distance above the cutting plane of the blades 11.

In order to prevent a moisture and/or chlorophyll build-up from affecting the operation of the mower 10 and to minimize hunting along the swath-edge 30, the sensors 33 and 34 have peripheral edges which are spaced from one another and the adjacent structure of the mower 10 by means of an insulating air gap. For instance, the sensor 33 has an edge 33b (FIG. 1) extending in the direction of movement of the mower 10, and the sensor 34 has an edge 34b extending substantially parallel to the edge 33b. Preferably, the spacing between the edges 33b and 34b corresponds substantially to the widthwise or transverse dimension (relative to the path of movement of the mower) of the left sensor 33. For example, it is desirable for the left sensor 33 to be between 2 – 4 inches wide and for the spacing between the edges 33b and 34b to be in a range of between 2 inches and 4 inches to ensure satisfactory guidance of the mower 10 with a minimum of hunting along the swath-edge 30. Thus, the width of the left sensor 33 should be in a range of 10 – 20% of the cutting width of the blades 11. It is noted that the stanchions, such as the stanchion 40 (FIG. 1) are spaced inwardly of the edges of the sensors, and the edges of the sensors 33 and 34 are spaced a minimum horizontal distance of about one-half inch from the deck 13 of the mower 10 to ensure adequate air-gap insulation. However, the sensors 33 and 34 are located below and spaced from the arm 21. A limit bar 45 having depending legs 45a, 45a (FIG. 2) is mounted on the arm 21 to engage the caster wheel 20 such as indicated in FIG. 1 for preventing the caster wheel 20 from contacting and possibly grounding either of the sensors 33 and 34 as the mower 10 turns rightward or leftward. Thus, false signals are prevented from being injected into the circuit 35. Of course, the caster wheel 20 could be mounted ahead of the deck 13 a sufficient distance to clear the sensors 33 and 34 and, if desired, a pair of caster wheels may be provided to support the front of the mower.

C. The Steering Apparatus

Figure 4:
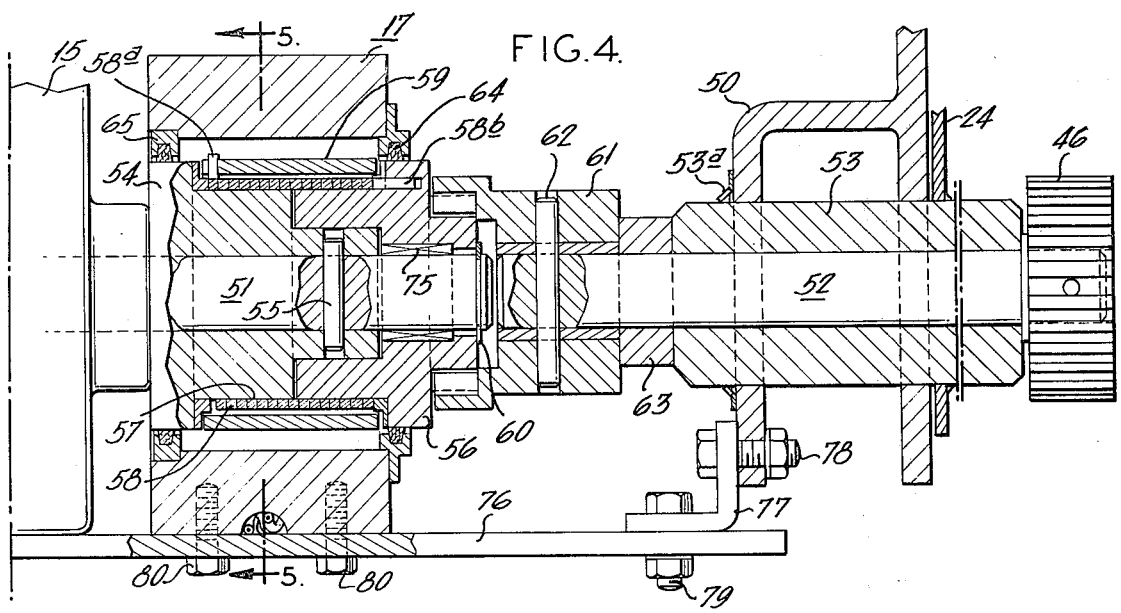
FIG. 4 is an enlarged sectional view of the area enclosed by broken lines in FIG. 3 and illustrating one of the clutch-brake assemblies which is employed to steer the mower of the present invention.

Before discussing the circuit 35 in detail, it is believed desirable at this juncture to discuss the operation of the clutch-brake assemblies 16 and 17 which steer the mower 10 so that the operation of the circuit 35 may be better understood. As best seen in FIGS. 3 and 4, (Sheet 2) the right clutch-brake assembly 17 is mounted between the transmission 15 and a rearward extension 50 of the deck 13. An input shaft 51 extends rightward from the transmission 15 and terminates adjacent the end of an output or drive shaft 52 which is disposed coaxially with the input shaft 51. The output shaft 52 rotates inside a bushing 53 which is rotatably mounted in the rearward extension 50. The output shaft 52 is fixedly connected to a pinion gear 46 which mates with a conventional internal gear (not shown) on the inner periphery of the right drive wheel 19. The bushing 53 is secured to the height-adjustment lever 24 to pivot when the lever 24 is pivoted for adjusting the height of the blades 11, and the bushing 53 is prevented from moving righward relative to the extension 50 by an annular retaining ring 53a.

The clutch-brake assembly 17 is of the spring-wrap type having a shouldered input drum 54 fastened to the input shaft 51 by a drive pin 55, and a shouldered output drum 56 surrounding the drive pin 55 to form a cylindrical surface 57 engageable by a spring 58 which surrounds the surface 57. One end 58a of the spring 58 extends radially outward from the surface 57 and is engaged in a notch in a hollow cylindrical tube 59 which surrounds the periphery of the spring 58. The other end 58b of the spring 58 extends axially and is received in the radially-extending shoulder of the output drum 56. A split ring 60 rotatably mounts the output drum 56 on the input shaft 51 and operates to prevent the input and output drums 54 and 56, respectively, from moving axially relative to one another. The output drum 56 is coupled to the output shaft 52 through a splined coupling 61 which is fastened to the output shaft 52 by means of a drive pin 62. A spacer 63 is interposed between the coupling 61 and the bushing 53 to permit the coupling 61 to be disengaged from the output drum 56 after the drive pin 62 is removed and the output shaft 52 displaced axially rightward beyond the spacer 63. This provides access to the split ring 60 to permit removal of the drum 56 for replacing the spring 58 in the event of breakage. The interior of the clutch-brake assembly 17 is protected from dirt and foreign matter by a pair of dust seals 64 and 65 which engage the periphery of the input and output drums 54 and 56, respectively.

Figure 5:
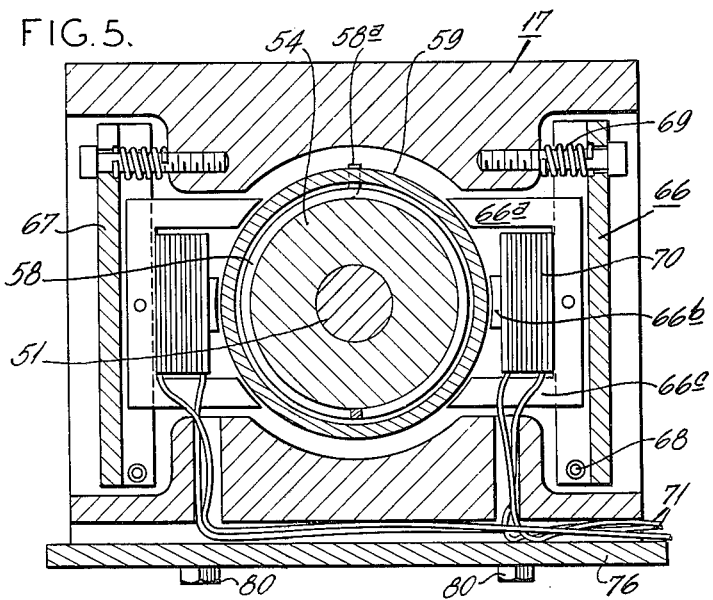
FIG. 5 is a sectional view taken along line 5—5 of FIG. 4.

As best seen in FIG. 5, a pair of brake shoes 66 and 67 are located diametrically opposite one another, and they confront the outer periphery of the tube 59. Each brake shoe, such as the right shoe 66, is pivotally mounted at its lower end by means of a pin 68, and the shoe 66 is normally biased away from the periphery of the tube 59 by a compressive spring 69 which urges the upper end of the shoe 66 rightward about its pivot pin 68. The shoe 66 has three leftward-extending prongs 66a, 66b and 66c. A coil 70 surrounds the central prong 66b and is connected into the circuit 35 by means of lead wires 71, 71. When a voltage is applied across the coil 70, a magnetic circuit is set up in the prongs 66a, 66b and 66c to cause the brake shoe 66 to pivot leftward about the pin 68 and to engage the tube 59. It is noted that the shoe 67 is similarly constructed and mounted so that both shoes 66 and 67 are energized simultaneously in response to a 12 V.D.C. voltage applied across the lead wires 71, 71.

In operation, the application of voltage causes the shoes 66 and 67 to grip the tube 59 and to stop it from rotating. The left portion of the spring 58 then unwraps from the input drum 54 to permit the input drum 54 to slip relative to the spring 58 and tube 59. At the same time, rotation of the output shaft 52 tends to cause the right portion of the spring 58 to expand outwardly to engage the inside of the tube 59. Since the tube 59 is held stationary by means of the brake shoes 66 and 67, rotation of the shaft 52 is arrested, and consequently, the right wheel 19 is braked. When the voltage is removed, the shoes 66 and 67 disengage the tube 59, thereby permitting the spring 58 to wrap onto the input and output drums 54 and 56 to couple the input shaft 51 with the output shaft 52 for rotating the wheel 19.

In order to prevent the output shaft 42 from overrunning from input shaft 51, for example when the mower 10 travels downhill, a sprag clutch 75 is provided between the output drum 56 and the input shaft 51. The sprag clutch 75 prevents the output shaft 52 from rotating faster than the input shaft 51 while permitting the input shaft 51 to rotate relative to the output shaft 52 when the output shaft 52 is arrested due to the braking action of the clutch-brake assembly 17.

In the present instance, the clutch-brake assemblies 16 and 17 are mounted to the mower 10 by means of a plate 76 which extends between the rear wheels 18 and 19 and underneath the transmission 15. As best seen in FIG. 4, the right end of the plate 76 is fastened to the rearward extension 50 by an L-shaped bracket 77 and a pair of bolts 78 and 79, and the clutch brake assembly 17 is fastened to the plate 76 by threaded fasteners 80, 80. Other than the manner in which the clutch brake assemblies 16 and 17 are installed in the mower 10, they do not constitute a part of the present invention. The above description is provided in order to disclose one form of mounting arrangement for such clutch-brakes which has proven satisfactory in use. Although the above arrangement operates satisfactorily when the mower 10 is in its automatic mode, it has been found that when the mower 10 is operated in the manual mode, both wheels 18 and 19 are driven at the same speed. As a result, when turning a corner, the inside wheel tends to rotate relative to the earth, and the mower 10 is difficult to steer because of the absence of a differential action. Moreover, since the wheels 18 and 19 have high-traction treads, such relative rotation tends to tear the underlying turf.

Figure 6:
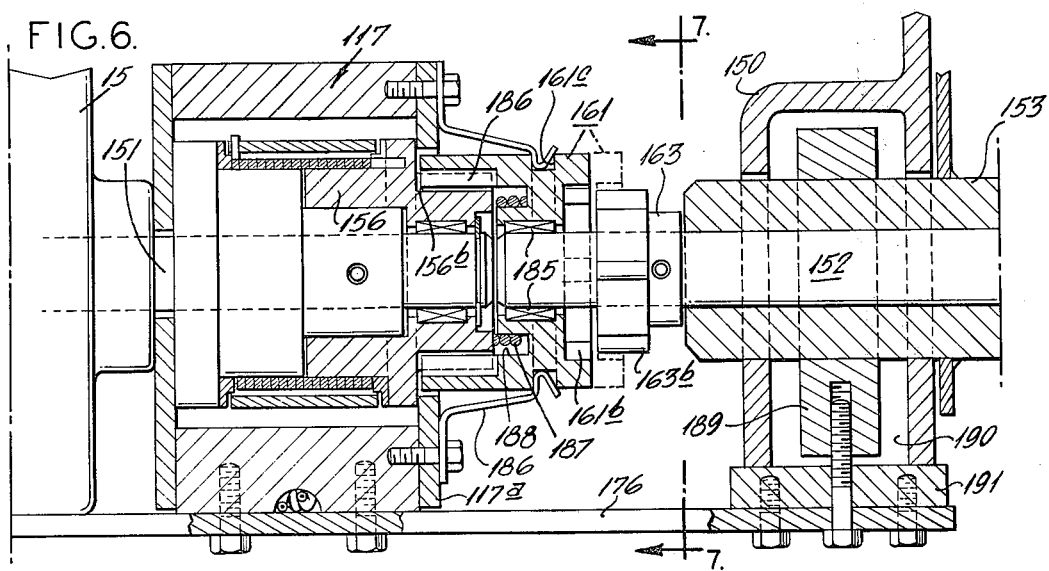
FIG. 6 is a sectional view similar to FIG. 4 but illustrating a modified clutch-brake assembly.

According to the present invention, a modified clutch-brake assembly 117 is provided with means for connecting the output drum to the output or drive shaft in a manner which permits the drive shaft to overrun the input shaft when the mower is in its manual mode while preventing the output shaft from overrunning the input shaft when the mower is in its automatic mode. To this end, a modified output drum or hub 156 (FIG. 6) is mounted on an input shaft 151 similarly to the drum 56 in FIG. 4. The output hub 156 is splined at 156b for slidably engaging a splined coller 161. The right hand end of the roller 161 is internally splined at 161b for matingly engaging external splines 163b on a spacer 163 which is pinned to the output shaft 152. A sprag clutch 185 is carried by the collar 161 and engages the output shaft 152. The sprag clutch 185 operates when the roller 161 is slid axially into the full line position illustrated in FIG. 6 to permit the output shaft 152 to overrun or rotate forwardly (clockwise FIG. 2) relative to the collar 161 while preventing the output shaft 152 from rotating rearwardly relative to the collar 161. Thus, the desired differential action for cutting grass in the manual mode is provided, and when the collar 161 is slid into its broken line position the output shaft is rigidly connected to the output drum.

Figure 7:
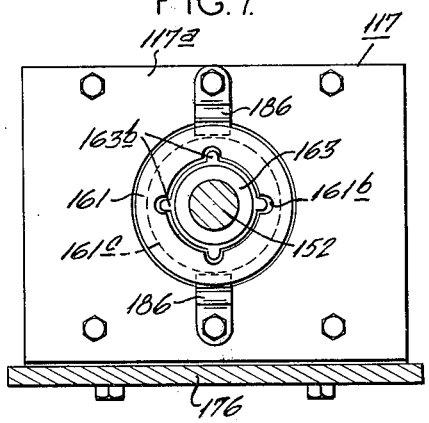
FIG. 7 is a sectional view taken along the line 7—7 of FIG. 6 but in reduced scale.

In order to maintain the collar 161 out of engagement with the spacer 163 when the mower is in the manual mode, a pair of spring forms 186, 186 (FIG. 7) are mounted diametrically opposite one another to the frame 117a of the clutch-brake 117. The spring forms 186, 186 engage in a groove 161c in the periphery of the collar 161 to counteract the bias of a compression spring 187 which is contained in a recess 188 in the collar 161 and which urges the collar 161 rightward into its broken line position in FIG. 6 in engagement with the splined spacer 163. When so engaged, the collar 163 rigidly couples the input shaft 151 to the output hub 156 so that driving torque to the right drive wheel is controlled solely by means of the clutch brake assembly for steering the mower in the automatic mode. It is noted that in this embodiment, the mounting plate 176 is fastened to the mower by a bearing block 189 which is contained inside a cavity 190 in a rearward extension 150. A spacer block 191 is provided between the bottom of the extension 150 and the top of the plate 176. This mounting arrangement also permits the bushing 153 to pivot relative to the rearward extension 150 as in FIG. 4 so that the height of the mower blades 11 may be adjusted as described above.

Having described the operation of the sensors which detect the swath-edge and the clutch-brake assemblies which steer the mower, attention will now be directed to the circuit which interconnects the sensors with the clutch-brake assemblies.

D. The Circuit

Figure 16:
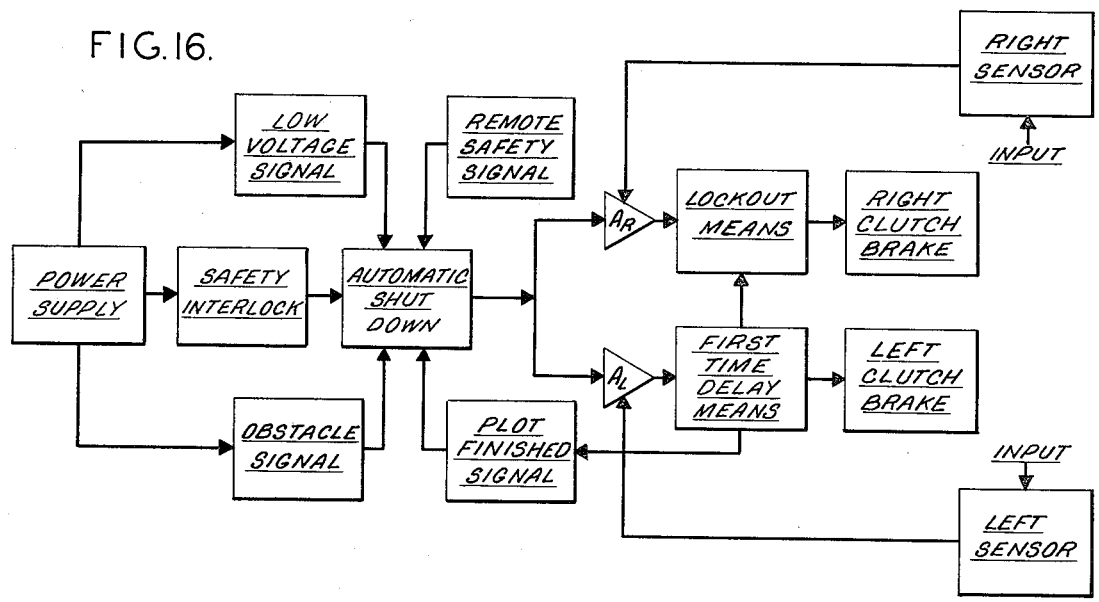
FIG. 16 is a block diagram of the circuit illustrated in FIG. 15.

Referring now to FIG. 15 (Sheet 4) the circuit 35 which couples the sensors 33 and 34 to their respective clutch-brake assemlies 16 and 17, respectively, is divided into four major sections: the section located above a median extending lengthwise of the sheet is the right amplifier section $A_R$; the section below the median is the left amplifier section $A_L$; the section extending lengthwise below the amplifier circuits is the automatic shut down section; and the section to the right of the automatic shut down section is the safety shut down section. A block diagram of the various circuit functions is provided in FIG. 16. As may be seen to the left in FIG. 15, power to the various sections of the circuit 35 is supplied by a rechargeable battery B which has its positive terminal connected to the deck 13 of the mower 10 and hence to the ground wheel 20 on the front of the mower. The negative terminal of the battery B is connected to the common of the two position switch $S_1$ which may be key-operated to provide a safety interlock. A receptacle 201 is connected to the positive terminal of the battery B, and one pole of the switch $S_1$ so that when the switch $S_1$ is in the full line position indicated, the battery B is capable of being recharged when a recharger R is plugged into the socket 201 and into a convenient 115 V.A.C. receptacle. The other pole of the switch $S_1$ is connected to a negative lead 202 through a fuse F, and the positive terminal of the battery B is connected to positive leads 203a and 203b.

The right and left amplifiers are fully transistorized, and the required biasing voltages are supplied from a common voltage divider which comprises three resistors: $R_1$, $R_2$ and $R_3$ which are connected in series relation between a positive terminal 205 and a negative terminal 206. The resistor $R_2$ is of the variable type for providing a bias voltage adjustment. The values of the various resistors, capacitors, transistors, etc. employed in the circuit 35 are set forth in detail in Table I below.

TABLE I

| Resistors | Value (ohms) | Resistors | Value (ohms) |
|---|---|---|---|
| $R_1$ | 560 | $R_{12}$, $R_{13}$, $R_{14}$ | 1,000 |
| $R_2$ | 1,100 | $R_{15}$ | 560 |
| $R_3$ | 270 | $R_{16}$ | 390,000 |
| $R_4$ | 15 meg | $R_{20}$ | 15 meg |
| $R_5$ | 100,000 | $R_{21}$ | 50,000 |
| $R_6$, $R_7$ | 1,000 | $R_{22}$ | 120,000 |
| $R_8$ | 1,200 | $R_{23}$ | 340 |
| $R_9$ | 1,000 | $R_{25}$ | 10,000 |
| $R_{10}$ | 560 | $R_{30}$ | 1,000 |
| $R_{11}$ | 100,000 | | |
| Capacitors | Value (mfd) | Transistors | Characteristic |
| $C_1$ | 10 | $T_1$, $T_6$ | high gain |
| $C_2$ | 10 | $T_2$, $T_3$, $T_4$ | medium gain |
| $C_3$ | 50 | $T_7$, $T_8$, $T_9$, $T_{10}$ | medium gain |
| $C_4$ | 2 | $T_5$, $T_{11}$ | power |
| $C_5$ | 50 | $T_{12}$, $T_{13}$ | medium gain |
| $C_6$ | 50 | | |

In order to supply voltage to the terminals 205 and 206, a relay 207 is provided. The contacts 207a of the relay 207 are connected in the negative lead 202 adjacent the fuse F. The coil 207b of the relay 207 is connected in series relation between an extension 207b of the negative line 202 and the positive line 203b through a normally-open, momentary-contact, push button switch $S_2$. Thus, when the switch $S_2$ is depressed, the coil 207b is energized and the contacts 207a are closed to cause a voltage to appear across the terminals 205 and 206. As will be discussed more fully hereinafter, coil 207b of the relay 207 is held in by a holding circuit which, in the present invention, functions as the automatic shut down circuit by deenergizing the coil 207b if the left sensor 33 is out of contact with uncut grass for more than a predetermined length of time.

Signals from the sensors 33 and 34 are supplied to the left and right amplifier sections of the circuit 35. As may be seen to the right in FIG. 15, the left amplifier $A_L$ has an input 210 and the right amplifier $A_R$ has an input 211. These inputs are connected through a selector switch $S_3$ to the leads 33a and 34a of the left and right sensors 33 and 34, respectively. The selector switch $S_3$ operates when in one position to prevent signals from the sensors 33 and 34 from being supplied to the inputs 210 and 211 when the mower is being operated in its manual mode and the sensors 33 and 34 are in contact with grass. The selector switch $S_3$ also operates when in its other position to connect the sensors 33 and 34 with their respective amplifier inputs 210 and 211. For the convenience of the operator of the mower 10, the switch $S_3$ is located in the upper right hand corner of the control box 36 illustrated in FIG. 3.

In the present instance, the switch $S_3$ is of the double-pole, double-throw type having common poles which are connected to the inputs 210 and 211. When the switch $S_3$ is in its down or manual-mode position, the left amplifier input 210 is connected through a resistor $R_4$ to positive or ground, and the other input 211 is open. As a result, a small current flows into the input 210 of the left amplifier $A_L$ to simulate a condition similar to the one which occurs when the left sensor 33 is in contact with grass when the mower 10 is in its automatic mode. Since no current is capable of flowing into the input 211 of the right amplifier $A_R$ a signal corresponding to a no-grass signal for the right sensor 34 is produced. As noted heretofore, when a signal is supplied to the left amplifier but not to the right amplifier, the clutch-brake assemblies 16 and 17 are deenergized, and power is supplied to both of the rear wheels 18 and 19 for propelling the mower so that it may be guided in its manual mode in the customary manner. The mower 10 is placed in its automatic mode when the switch $S_3$ is displaced upwardly to connect the input 211 of the right amplifier $A_R$ with the right sensor 34 and to connect the input 210 of the left amplifier $A_L$ to the left sensor 33.

Each clutch-brake assembly draws one ampere when energized by a 12 volt supply. It has been determined that each of the clutch-brake assemblies should be capable of being energized when a direct current as small as about 0.25 microamperes is fed into either the input 210 or 211 of the amplifiers. Thus, it should be apparent that each amplifier must be capable of providing current amplification of about 4,000,000/1. In actual tests, it has been determined that the amplifiers should be capable of producing a steering signal when at least a 50 megohm resistor is connected between the sensors and the ground wheel in order to ensure sensitivity as to enable the mower to cut relatively dry grass.

Referring now to the right amplifier $A_R$, the input 211 is connected through a high impedance resistor $R_5$ to the base of a high gain NPN transistor $T_1$. The emitter of the transistor $T_1$ is connected to an extension lead 206a of the negative terminal 206, and the collector of the transistor $T_1$ is connected through a resistor $R_6$ to the base of a PNP transistor $T_2$. The emitter of the transistor $T_2$ is connected to a terminal 215, and the collector of the transistor $T_2$ is connected through a resistor $R_7$ to the base of an NPN transistor $T_3$. The emitter of the transistor $T_3$ is connected to the anode of a diode $D_1$, and the cathode of the diode $D_1$ is connected to a terminal 216. A resistor $R_8$ is connected between the terminal 216 and the negative extension lead 206a. The collector of the transistor $T_3$ is connected through a terminal 217 to a resistor $R_9$ which in turn is connected to the base of a PNP transistor $T_4$. The emitter of the transistor $T_4$ is connected to the positive terminal 205, and the collector of the transistor $T_4$ is connected through a terminal 218 to a resistor $R_{10}$. The resistor $R_{10}$ is connected to the base of an NPN power transistor $T_5$. The emitter of the transistor $T_5$ is connected to the negative lead 206a, and the collector of the transistor $T_5$ is connected to the right clutch-brake assembly 17 which is grounded to the deck 13 of the mower 10. It has been found desirable to connect a capacitor $C_1$ between the terminal 218 and the negative lead 206a.

The right amplifier section $A_R$ of the circuit 35 operates in the following manner.

When the switch $S_3$ is in its up or automatic-mode position, and uncut grass 31 is interposed between the bottom of the right sensor 34 and the ground surface 23 as illustrated in FIG. 15, a small amount of current flows into the input 211 of the right amplifier. The current fires transistor $T_1$ which in turn causes transistors $T_2$, $T_3$, $T_4$, and $T_5$ to conduct. When the transistor $T_5$ conducts, current flows to the right clutch-brake assembly 17 to brake the right driving wheel 19. The mower 10 thus steers to the right until the right sensor 34 disengages uncut grass 31, whereupon the transistors $T_1$, $T_2$, $T_3$, $T_4$, and $T_5$ are rendered nonconducting and the right clutch-brake assembly 17 is deenergized.

The left amplifier section $A_L$ of the circuit 35 operates in a manner exactly opposite that of the right amplifier section of the circuit 35. For instance, when the left sensor 33 is contacting uncut grass 31 such as indicated in FIG. 1, the left clutch-brake assembly 16 is deenergized rather than being energized, as is the case when the right sensor 34 contacts uncut grass. Thus, the mower 10 steers a straight course with both wheels 18 and 19 being driven. For this purpose, the input 210 of the left amplifier $A_L$ is connected through a high impedance resistor $R_{11}$ to the base of a high gain NPN transistor $T_6$. The emitter of the transistor $T_6$ is connected to the negative terminal lead 206a, and the collector of the transistor $T_6$ is connected through a resistor $R_{12}$ to the base of a PNP transistor $T_7$. The emitter of the transistor $T_7$ is connected to an extension 205a of the positive terminal 205, and the collector of the transistor $T_7$ is connected to a terminal 220. The terminal 220 is connected to the cathode of a diode $D_2$, and the anode of the diode $D_2$ is connected directly to the base of a PNP transistor $T_8$. The emitter of the transistor $T_8$ is connected to the terminal 215, and the collector of the transistor $T_8$ is connected through a terminal 221 to a resistor $R_{13}$ and to the base of an NPN transistor $T_9$. The emitter of the transistor $T_9$ is connected to the negative extension lead 206a, and the collector of the transistor $T_9$ is connected through a terminal 222 and a resistor $R_{14}$ to the base of a PNP transistor $T_{10}$. The emitter of the transistor $T_{10}$ is connected to the positive terminal lead 205a, and the collector of the transistor $T_{10}$ is connected to a terminal 223. A resistor $R_{15}$ is connected between the terminal 223 and the base of an NPN transistor $T_{11}$. The emitter of the transistor $T_{11}$ is connected to the negative extension 206a, and the collector of the transistor $T_{11}$, which is a power transistor, is connected to the left clutch-brake 16 which is grounded to the deck 13 of the mower 10. It is noted that the terminal 223 is connected by a lead 223a to the anode of a diode $D_3$, and the cathode of the diode $D_3$ is connected to the terminal 216. The function of this interconnection will become apparent later in the description.

In order to bias the transistor $T_8$ into a conducting state so that the left clutch-brake 16 is energized when the left sensor 33 is out of contact with grass, the terminal 220 is connected to another terminal 225, and a variable resistor $R_{16}$ is connected between the terminal 225 and a terminal 226 located between the resistors $R_2$ and $R_3$. A capacitor $C_2$ is connected between the terminal 225 and the positive terminal extension 205a.

The operation of the left amplifier section $A_L$ of the circuit 35 will now be described.

When the left sensor 33 is out of contact with uncut grass, and current is not flowing in the input 210 of the left amplifier $A_L$, the transistor $T_8$ is biased into a conducting state by virtue of the interconnection of the diode $D_2$ with the resistor $R_{16}$ through the terminal 225. As a result, the transistor $T_9$ conducts and causes the transistor $T_{10}$ to fire the power transistor $T_{11}$ for energizing the left clutch-brake 16. When a small current signal is injected into the input 210 of the left amplifier $A_L$, the transistor $T_6$ fires and causes the transistor $T_7$ to apply a positive voltage to the terminal 220. A positive voltage at the terminal 220 causes the diode $D_2$ to cease conducting, and as a result, transistors $T_8$, $T_9$, $T_{10}$, and $T_{11}$ cease conducting. The left clutch-brake 16 is thereby deenergized, and power is supplied to the left drive wheel 18.

It is noted that when the transistors $T_6$ and $T_7$ conduct to apply a positive voltage to the terminal 220, the capacitor $C_2$ is charged. Thus, when the left sensor 33 breaks contact with uncut grass 31 and the transistors $T_6$ and $T_7$ cease to conduct, the capacitor $C_2$ continues to apply a positive voltage to the terminal 220 as it discharges through the resistor $R_{16}$ to the terminal 226. The time required for the capacitor $C_2$ to discharge may be determined by the setting of the resistor $R_{16}$. Preferably the resistor $R_{16}$ is selected to correspond with the total capacity of the capacitor $C_2$, and they are designed to provide a delay of about one (1) second between the time when the sensor 33 breaks contact with uncut grass and the time when the left clutch-brake assembly is fully energized. Of course, the magnitude of time and delay varies inversely with the speed of the mower 10. For instance, the faster the mower 10 travels, the shorter the time delay need be in order to ensure reasonably straight steering of the mower 10, since the left sensor 33 will not normally be out of contact with uncut grass for any appreciable time duration even when the mower is traversing relatively sparse growing areas or bare spots on the lawn. Conversely, if the mower were traveling relatively slowly, the magnitude of the time delay would have to be relatively large, since the left sensor 33 is likely to be out of contact with uncut grass 31 for appreciable periods of time when the mower 10 traverses sparsely growing areas or bare spots. It has been determined in actual tests that the time delay should be on the order of about 1 second when the mower has a ground speed of about 2 feet/second. The same time delay operates satisfactorily even when the ground speed of the mower is as slow as 1.3 feet/second or as fast as 2.6 feet/second. By providing suitable time delays for both sensors, it is believed that the sensors may be modified so that their longest dimensions are disposed transversely to the path of movement of the mower since the time delay provides the desired circuit continuity.

In order to prevent the mower 10 from coming to a complete stop in the event that the right sensor 34 contacts uncut grass while the left sensor 33 is out of contact with grass and the mower is steering leftward, there is provided means to lock out the steering capabilities normally afforded by the right sensor 34. For this purpose, interconnection 223a causes the diode $D_3$ to conduct and to apply a positive voltage to the terminal 216 when the transistor $T_{10}$ conducts to energize the left clutch-brake assembly 16. When a positive voltage appears at terminal 216, the diode $d_1$ is rendered non-conducting, thereby preventing energization of the right clutch-brake assembly 17 through its associated transistors $T_3$, $T_4$, and $T_5$ even though the right sensor 34 may be contacting uncut grass. The value of the resistor $R_8$ is selected to be relatively high as compared with the impedence of the left clutch-brake assembly 16 as not to shunt any current away from the base of the power transistor $T_{11}$. As a result, a braking signal is prevented from being sent to the right clutch brake assembly 17 when the left sensor 33 is out of contact with uncut grass 31 and the mower 10 is steering leftward.

The mower 10 is capable of shutting itself off automatically when finished mowing an assigned area. To this end, the relay 207 is deenergized when the left sensor 33 is out of contact with uncut grass 31 for a predetermined period of time. In other words, the holding circuit operates to maintain the coil 207b energized only as long as the left sensor 33 is in contact with uncut grass 31 and for a brief period of time thereafter. The period of time before shut down is preferably on the order of at least about 5 and possibly 15 seconds and is considerably larger than the short period of time on the order of about one (1) second noted heretofore with respect to the delay between energization of the left clutch brake 16 and loss of contact of the left sensor 33 with grass. In the present instance, the automatic shut down circuit includes a zener diode $z_1$ having its cathode connected to the terminal 220 and its anode connected to a terminal 230. A high impedance resistor $R_{20}$ is connected between the terminal 220 and the negative lead 202. The anode of a diode $D_4$ is connected to the terminal 230, and the cathode of the diode $D_4$ is connected to a terminal 231. A capacitor $C_3$ is connected between the terminal 231 and the negative lead 202. A normally-open, momentary-contact, push button switch $S_4$ is connected in parallel with the capacitor $C_3$. A resistor $R_{21}$ is connected between the terminal 231 and the base of an NPN transistor $T_{12}$. The emitter of the transistor $T_{12}$ is connected to the negative lead 202, and the collector of the transistor $T_{12}$ connected through a resistor $R_{22}$ to the base of a PNP transistor $T_{13}$. The emitter of the transistor $T_{13}$ is connected to the positive lead 203b, and the collector is connected to the coil 207b of the relay 207. Thus, when the transistors $T_{12}$ and $T_{13}$ conduct, the coil of the relay 207 is energized.

In order to energize the holding or shut down circuit, the selector switch $S_3$ is placed in the manual mode position, and the main power switch $S_1$ is closed. The push button switch $S_2$ is depressed to energize momentarily the coil 207b of the relay 207 and to close the contacts 207a. When the contacts 207a close, voltage is applied across the terminals 205 and 206, and a positive voltage is applied at the terminal 220. As long as the voltage of the battery B is above the breakdown voltage of the zener $Z_1$, the capacitor $C_3$ is charged through diode $D_4$. It is noted that the zener $Z_1$ is selected so that its breakdown voltage is about 10 volts in order to prevent the mower 10 from being placed in the automatic mode with a low battery. When the capacitor $C_3$ is charged, the transistor $T_{12}$ fires and causes the transistor $T_{13}$ to conduct and to maintain the coil 207b energized even after the push button $S_2$ is released. The capacitor $C_3$ and the resistors $R_{21}$ and $R_{22}$ and the transistors $T_{12}$ and $T_{13}$ are selected to ensure energization of the coil 207b for at least 5 seconds and preferably about 15 seconds after a positive voltage is removed from the terminal 220, such as occurs when the left sensor loses contact with uncut grass. By virtue of this circuit arrangement, the mower 10 is capable of pivoting in a leftward turning circuit for at least 180° and preferably for a few turns in search of uncut grass before power to the circuit 35 is interrupted. Of course, the power to the circuit 35 may be interrupted manually when the switch $S_4$ is depressed to discharge the capacitor $C_3$ and thereby to deenergize the relay 207.

When power to the circuit 35 is interrupted, the engine 12 stops. To this end, the primary winding of the ignition of the engine 12 is connected through the normally-closed contacts of a relay 235 to ground. The coil 235a of the relay 235 is connected in series with a resistor $R_{23}$ across positive ground lead 203b and a rightward continuation 202a of the negative lead 202. Thus, when the coil 207b of the relay 207 is deenergized, the contacts 207a open to deenergize the coil 235a of the relay 235. As a result, the primary winding of the engine ignition is grounded to stop the engine 12 and hence the mower 10. At the same time, a pilot lamp $P_1$ which is connected to the normally-open contacts of the relay 235, is extinguished. Of additional importance is the fact that in the event of a steering malfunction which would cause the mower to traverse cut grass, the absence of grass contact with the left sensor 33 will stop the mower. Thus, at a speed of 2 fps, the mower could not travel more than 30 feet before being stopped automatically.

The mower 10 is capable of shutting itself off in the event that it contacts an obstacle. For this purpose, a pressure-sensitive safety bumper switch $S_5$ extends around the front and sides of the mower 10 ahead of the sensors 33 and 34. One lead of the switch $S_5$ is grounded to the deck 13, and the other lead is connected to a terminal 236. The terminal 236 is connected through a resistor $R_{25}$ to the gate of a silicon control rectifier SCR. The anode of the SCR is connected to terminal 237 between the resistor $R_{23}$ and the coil 235a of the engine relay 235. The cathode of the SCR is connected to the negative extension 202a. A capacitor $C_4$ is connected between the terminal 236 and the negative extension 202a. With this structure, a positive pulse is applied to the gate of the SCR when the bumper switch $S_5$ is closed, and as a result, current is shunted around the coil 235a to cause the relay 235 to open, thereby stopping the engine 12. Of course, in such event, power to the circuit 35 is not interrupted. It is noted that gate control for the SCR is reestablished when the master switch $S_1$ is opened.

As an additional safety feature, a wire 240 may be strung from metal poles 242, 242 around the perimeter of an area to be mowed such as illustrated in FIG. 8. In such case, the mower 10 is provided with an upstanding metal rod 241 which projects upwardly a sufficient distance as to engage the wire 240 when the mower 10 reaches the perimeter of the area it is cutting. The wire 240 is grounded through the poles 242, 242, and the rod 241 is connected to the terminal 236. Thus, when the rod 241 engages the wire 240, the SCR is gated by a positive pulse to drop out the relay 235 and thereby stopping the engine 12. It is noted that the rod 241 may also extend laterally of the mower for engaging an upstanding pole or fence to stop the engine 12.

Figure 17:
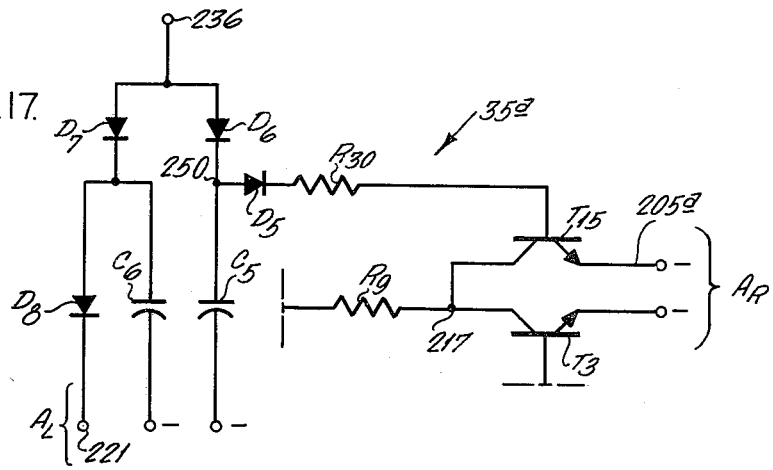
FIG. 17 is a schematic diagram of a circuit which may be utilized in conjunction with the circuit of FIG. 15 to cause both of the clutch-brake assemblies to be energized simultaneously when the mower contacts an obstacle; and, FIG. 18 is a schematic diagram of another circuit which may be employed in conjunction with the circuit of FIG. 15 to arrest motion of the mower in the event of a malfunction of the mower guidance system.

As a still further safety feature, the present invention provides means for simultaneously braking both wheels 18 and 19 when the bumper switch $S_5$ contacts an obstacle or when the rod 241 contacts the safety wire 240 so that forward motion of the mower 10 is halted long enough to enable the blades 11 to come to a complete stop. To this end, the circuit 35a illustrated in FIG. 17 is provided, and the circuit 35a operates to store a charge of electricity when the switch $S_5$ is contacted and to dissipate the charge through certain of the transistors in the right and left amplifier sections of the circuit 35 for energizing the clutch-brakes 16 and 17 until the charge dissipates. For this purpose, an NPN transistor $T_{15}$ is connected in parallel with the transistor $T_3$ between the terminal 217 and the negative lead extension 205a with the collector of the transistor $T_{15}$ being connected to the terminal 217. The base of the transistor $T_{15}$ is connected through a resistor $R_{30}$ to the cathode of a diode $D_5$, and the anode of the diode $D_5$ is connected to a terminal 250. A capacitor $C_5$ is connected between the terminal 250 and negative. The cathode of a diode $D_6$ is connected to the terminal 250, and the anode of the diode $D_6$ is connected in the circuit 35 to the terminal 236 (at the lower right in FIG. 15). A diode $D_7$ is connected with its anode to the terminal 236 and its cathode to the anode of another diode $D_8$ and a capacitor $C_6$. The cathode of the diode $D_8$ is connected to the terminal 221 in the left amplifier section of the circuit 35, and the capacitor $C_6$ is connected to negative.

The circuit 35a operates as follows.

When the bumper switch $S_5$ contacts an obstacle and applies a positive voltage to terminal 236, the capacitors $C_5$ and $C_6$ are charged through diodes $D_6$ and $D_7$, respectively. The capacitor $C_5$ discharges through diode $D_5$ and resistor $R_{30}$ to trigger transistor $T_{15}$ which in turn triggers transistors $T_4$ and $T_5$ (FIG. 15) to energize the right clutch brake 17. At the same time, the capacitor $C_6$ discharges through the diode $D_8$ to the terminal 221 in the left amplifier section of the circuit 35 to trigger the transistors $T_9$, $T_{10}$ and $T_{11}$ for energizing the left clutch-brake 16. Thus, both the left and right wheels 18 and 19 are braked simultaneously with the capacitors $C_5$ and $C_6$ causing the clutch-brakes 16 and 17 to be energized for about 15 seconds to ensure that the blade 11 comes to a complete half while forward motion of the mower 10 is arrested. It is noted that the transistor $T_{15}$ in the circuit 35a bypasses the transistor $T_3$, diode $D_1$ and resistor $R_8$ in the right amplifier section $A_R$ of the circuit 35 so that the lockout function normally afforded by the diode $D_3$ interconnection does not prevent the right clutch-brake 17 from being energized when the left clutch-brake 16 is energized.

Figure 18:
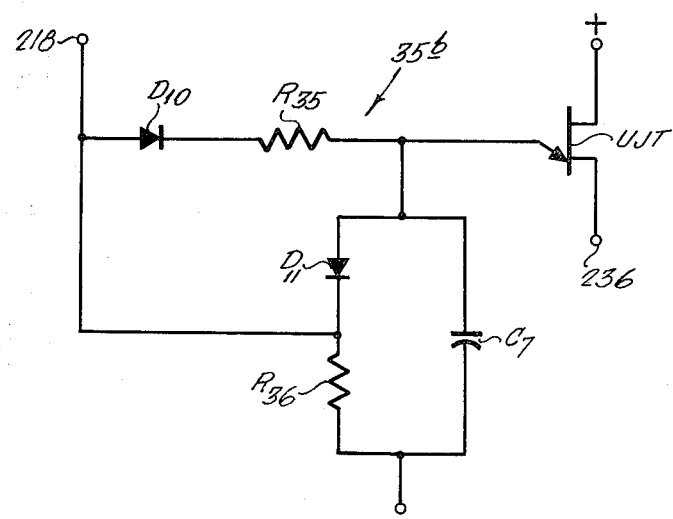

An noted heretofore, the mower 10 is capable of turning itself off automatically when finished mowing and in the event of a steering malfunction which would cause the mower to traverse cut grass. In order to provide a corresponding safety shut down in the event of a steering malfunction which could cause the mower to traverse uncut grass, a circuit 35b (FIG. 18) is provided. The circuit 35b operates to stop the mower in the event that the right sensor 34 is in contact with cut grass for longer than a predetermined period of time. To this end, the circuit 35b incudes a unijunction transistor UJT which is connected between positive and the terminal 236 at the lower right in the circuit 35. The emitter of the unijunction transistor UJT is connected through a resistor $R_{35}$ to the cathode of a diode $D_{10}$. The emitter of the unijunction transistor UJT is also connected to a capacitor $C_7$ which is connected to negative. A diode $D_{11}$ and a resistor $R_{36}$ are connected in parallel with the capacitor $C_7$. The anode of the diode $D_{10}$ is connected to the terminal 218 in the circuit 35, and a lead 255 connects the terminal 218 to the cathode of the diode $D_{11}$.

The circuit 35b operates as follows.

When a braking signal is supplied to the right clutch-brake 17, a positive voltage appears at the terminal 218. A like voltage also appears at the cathode of the diode $D_{11}$ so that the capacitor $C_7$ is charged through the diode $D_{10}$ and the resistor $R_{35}$. If the braking signal is applied for a long enough period of time, the capacitor $C_7$ charges up until the peak point for the unijunction transistor UJT is reached, whereupon the unijunction transistor UJT fires and gates the silicon control rectifier SCR to stop the engine 12 as discussed heretofore. It is noted that in the event that the positive braking signal is removed from the terminal 218 before the time period elapses, such as would occur when the mower makes minor course corrections, the capacitor $C_7$ is discharged through the diode $D_{11}$ and resistor $R_{36}$ because the removal of a positive voltage from the cathode of the diode $D_{11}$ permits the same to conduct. As a result, the circuit 35b is reset so that the time period is always counted from the application of a braking signal to the terminal 218. Preferably, the values of the resistor $R_{35}$ and the capacitor $C_7$ are selected so that the mower 10 is capable of pivoting rightward through an arc of at least 180° or for at least about 5 seconds before the engine 12 is stopped. The reason for these time periods is that the right sensor normally only contacts uncut grass for very brief periods of time when the mower 10 is steering along a swath. Since the above periods are longer than those normally encountered, an indication of a steering malfunction, such as a broken clutch spring, would cause the right sensor 34 to be in contact with grass for longer than normal time periods for causing the engine 12 to shut down as a safety feature. It is noted that since the circuit 35b has not been tested, values for the various components are not set forth in Table I.

E. Modified Sensors

Figure 10:
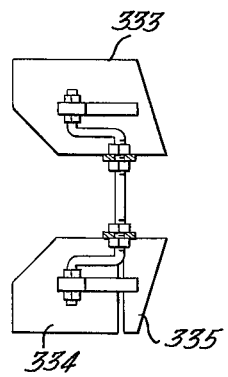
FIG. 10 is a plan view of a modified pair of sensors, the view being similar to the view of the sensors illustrated in FIG. 1.
Figure 13:
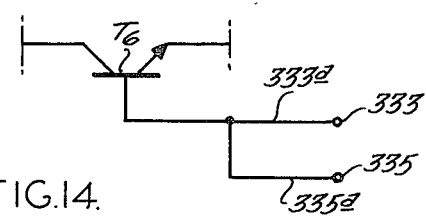
FIG. 13 is a schematic diagram of a circuit which is employed in conjunction with the modified sensors illustrated in FIG. 10.

The mower 10 is capable of guiding itself along a swath-edge 30 even when the uncut grass 31 grows relatively sparsely or there are bare spots in a lawn, and for this purpose, a modified sensor assembly is provided. As best seen in FIGS. 10 and 13, the modified assembly includes a left sensor 333, similar to the sensor 33, a right sensor 334, and an auxiliary sensor 335 mounted ahead of and spaced from the right sensor 334. As may be seen in FIG. 13, the auxiliary sensor 335 is connected by a lead 335a in parallel with the lead 333a of the left sensor 333 to the base of the transistor $T_6$ in the circuit 35 (FIG. 15). The auxiliary sensor 335 normally overlies the cut grass and does not perform any guidance function until such time as the left sensor 333 loses contact with uncut grass. At that time, the mower steers leftward causing the left sensor 333 to move toward uncut grass and the auxiliary sensor 335 likewise to move toward uncut grass. The effect of this action is to double the effective widthwise dimension of the left conductor 333 so that the possibility is increased that one or the other sensor 333 or 335 will contact blades of uncut grass for straightening the path of the mower and enabling the right sensor 334 to send a braking signal to the right clutch-brake 17 for steering the mower rightward away from the uncut grass. Thus, it should be apparent that the mower 10 is capable of steering itself through even sparsely growing areas of grass.

Figure 11:
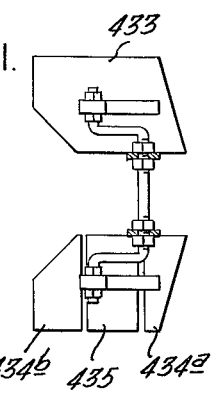
FIG. 11 is a view similar to FIG. 10 but of still another modified pair of sensors.
Figure 14:
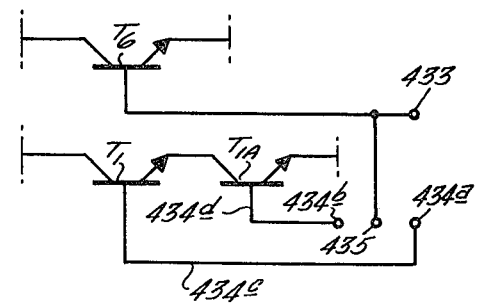
FIG. 14 is a view similar to FIG. 13 but of a modified circuit for use in conjunction with the modified sensors illustrated in FIG. 11.

In the course of operation of the mower 10 in the automatic mode, the swath-edge may be formed with cusps. Since the mower 10 would normally tend to steer around such cusps, it should be apparent that the cusps may become larger and larger each time the mower completes a trip around the lawn. In order to avoid the formation of cusps, another modified sensor assembly is provided. As best seen in FIGS. 11 and 14, the modified assembly includes a left sensor 433 and a right sensor having two sections 434a and 434b. The section 434a is mounted ahead of the section 434b and is spaced therefrom a slight distance. An auxiliary sensor 435, similar in function to the auxiliary conductor 335 is mounted between the two sections 434a and 434b. The auxiliary conductor 435 is connected in the circuit of FIG. 14 similarly to the manner in which the auxiliary conductor 335 is connected in the circuit of FIG. 13. However, the sensors 434a and 434b are connected in a manner which requires substantially simultaneous contact of both before a braking signal is sent to the right clutch-brake 17. For this purpose, the circuit 35 is modified by connecting a second NPN transistor $T_{1A}$ in series with the transistor $T_1$. The base of the transistor $T_1$ is connected by a lead 434c to the leading sensor section 434a, and the base of the transistor $T_{1A}$ is connected by a lead 434d to the trailing section 434b. By virtue of this arrangement, both of the sensor sections 434a and 434b must be in contact with uncut grass before a right-steering signal is sent to the right clutch-brake 17. Thus, if the cusp is relatively narrow, the leading section 434a will pass the cusp before the trailing section 434b contacts the cusp, thereby enabling the mower 10 to steer a straight course across the cusp for cutting the same. The presence of the auxiliary sensor 435 between the sections 434a and 434b renders the sensor assembly relatively compact.

Figure 12:
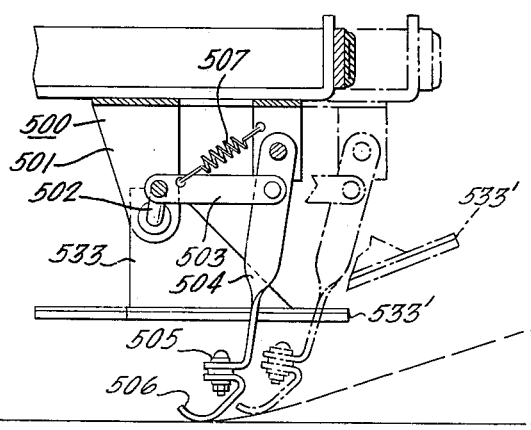
FIG. 12 is a side elevational view of apparatus for use in conjunction with the sensors to maintain the sensors substantially parallel with the underlying ground surface as the mower advances.

In order to enable the mower 10 to cut grass growing on all types of terrain, it is desirable for the sensors to be maintained substantially parallel to the ground at all times, particularly when they are elongated in the direction of movement of the mower. For instance, if sensors 533 and 534 were fixedly mounted to the mower as indicated in FIGS. 1 and 2 and the mower were to approach a sharp incline such as indicated in broken lines in FIG. 12, the spacing between the leading edges 533' and 534' of the sensors and the incline would decrease and cause the sensors to contact cut grass on the incline for steering the mower away from the swath-edge. However, according to the present invention, there is provided means for maintaining the sensors properly spaced from the ground surface at all times. To this end, both sensors, such as the left sensor 533 illustrated in FIG. 12, are mounted to pivot on an axis transverse to the path of movement of the mower by a bracket 500 having depending bifurcations 501 which rotatably receive a horizontally-disposed crank 502. The crank 502 is fastened to the sensor-stanchions so that the sensors pivot about a horizontal axis when the crank 502 pivots. The crank 502 is connected by a forwardly-extending link 503 to a depending ground-engaging member 504 which is pivotally connected to the bracket 500. The lower end of the depending member 504 carries a swivel assembly 505 to which a ground follower 506 is fastened with the swivel assembly 505 preventing the ground follower 506 from gouging the ground as the mower turns leftward or rightward by permitting the follower to pivot about a vertical axis. With this structure, the member 504 pivots clockwise and displaces the link 503 rearwardly for turning the crank 502 and sensor 533 counterclockwise when the follower 506 engages an incline as illustrated in broken lines in FIG. 12. As a result, the leading edge 533' of the sensor 533 is raised upwardly away from cut grass on the incline. In order to cause the leading edge 533' to pivot downwardly when the mower approaches a decline in the surface 523, the leading edge 533' is biased downwardly by means of a compression spring 507 connected between the link 503 and a forward portion of the bracket 500. Thus, as the mower approaches a decline, the follower 506 and ground-engaging member 504 are pivoted counterclockwise by the action of the spring 507 to cause the leading edge 533' to pivot downwardly. It is noted that lengths of the link 503, the ground member 504, etc. are selected so that the bottom of the sensor 533 is disposed substantially parallel with the underlying ground surface 523 when the mower is on ground which is substantially flat.

F. Method of Cutting Grass

According to the present invention, a method is provided for using the mower in a manner which enables the mower to employ uncut grass as a safety barrier and to avoid obstacles such as trees and shrubs, etc. when the mower is operating in its autmoatic mode. For instance, the mower may be used to cut grass in every decreasing patterns such as described in my U.S. Pat. No. 3,425,197. When used in such manner, the mower has the advantage of working its way toward the center of an area and turning itself off automatically when finished; however, there exists the possibility that some malfunction could cause the mower to depart from the swath-edge.

In order to avoid such possibility, the mower is guided manually into an area of uncut grass such as the grass 31 in FIG. 8 without cutting a swath. This may be effected by tilting the handle of the mower downwardly to raise the mower blades. A small area of grass 32 is then cut inside the larger area to cause the uncut grass 31 to define a closed perimeter around the cut area 32. If desired, the mower 10 may then be placed in its automatic mode so that it operates in ever expanding patterns to cut the area 31. When so used, it is desirable for the safety wire 240 to be installed to shut down the mower when it finishes cutting the area 31. It is noted that the uncut grass 31 completely surrounds the cut grass 32 and acts as a safety barrier to contain the mower within its assigned cutting area.

The mower may be operated in a manner as to enable it to avoid obstacles. For instance, if an obstacle were located in the area illustrated in FIG. 8, the mower 10 would be guided into the area 31 and around the obstacle to form an area of cut grass such as the area 32. The mower could then be placed in the automatic mode to work its way outwardly, as noted above, or it could be guided away from the area 32 and through the uncut grass 31 without cutting a swath, and used to cut a swath around the outside of the area 31. Thus, when the mower is placed in its automatic mode the mower works its way inwardly along the outer swath until the outer swath ultimately intersects the inner swath. At such point the mower locks-onto the inner swath and travels around the obstacle to the point where the inner swath intersects the outer swath, whereupon the mower again locks-onto the outer swath and continues to travel around the area.

In view of the foregoing, it should be apparent that an improved automatic lawn mower which operates safely and efficiently has now been provided, and while preferred embodiments of the present invention have been described in detail, various modifications, alterations, and changes may be made without departing from the spirit and scope of the present invention as defined in the appended claims.

For example, while the disclosed auto-pilot apparatus has particular utility in conjunction with the automatic guidance of lawn mowers, it should be apparent that the apparatus may also be utilized in conjunction with other vehicles such as grain and hay harvesters and the like wherein automatic guidance along a pre-cut swath is desired. Moreover, although reference has been made throughout to sensors which contact vegetation to pass current therethrough for producing a steering signal, it is contemplated that a very minute current would pass through the vegetation if the sensors were spaced from the top of the uncut vegetation so as to sense the capacitance of an air gap between the sensors and the vegetation. In this regard, it may be desirable to apply an alternating voltage or periodic voltage pulses to the sensors. Furthermore, it should be apparent that the disclosed auto-pilot apparatus may also be utilized in conjunction with rod-like conductors which are disposed horizontally ahead of the vehicle to pass current through uncut vegetation. In such event the rods would be provided with upturned end portions which function as stanchions and which are connected to the vehicle above horizontally-disposed portions of th rods. The use of suitable time delays in conjunction with rod-like sensors and the disposition of the sensors transversely to the path of movement of the vehicle would provide a very compact sensor arrangement. Additionally, it is noted that it may be necessary for the sensitivity of the amplifier means to be increased above the sensitivity disclosed herein in order to enable the auto-pilot apparatus to guide a mower or other harvesting vehicle along a swath cut through very dry vegetation such as mature grain crops.

I claim:

1. In combination with a self-propelled vehicle having a power source; means connected to said power source for cutting a swath of vegetation projecting upwardly from the ground; means for steering the vehicle in response to a signal; and means for guiding a vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, the improvement wherein said sensor means includes a plurality of electrical conductors having edges defining their peripheries with a portion of the periphery of one conductor being located adjacent a portion of the periphery of the other conductor and means mounting said conductors to said vehicle with an air gap surrounding their edges and disposed between said adjacent portions to insulate said conductors from said vehicle and from one another.

2. Apparatus according to claim 1 wherein said conductors have confronting edges defining said portions of their peripheries and extending in the direction of movement of the vehicle.

3. Apparatus according to claim 1 wherein said conductor has a leading edge, and including pivot means pivotally connecting said conductor to said vehicle to permit said conductor to pivot about an axis transverse to the path of movement of the vehicle, ground-engaging means depending from said vehicle adjacent said conductor, means mounting said ground-engaging means to pivot on a similar transverse axis, and link means connecting said ground-engaging means to said conductor pivot means to pivot the leading edge of said conductor upwardly when said ground-engaging means engages a raised zone in the ground.

4. Apparatus according to claim 3, including means for biasing said leading edge downwardly to cause the leading edge of the conductor to pivot downwardly about its pivot connection when the ground-engaging means engages a depressed zone in the ground.

5. Apparatus according to claim 4 wherein said ground-engaging means includes follower means and means providing a vertical swivel connection between said ground-engaging means and said follower means, so that the follower means is free to swivel on a vertical axis as the vehicle steers.

6. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, the improvement wherein said sensor means includes at least one electrical conductor having edges defining its periphery and means mounting said conductor to said vehicle with an air gap surrounding the edges and insulating said conductor from said vehicle, said mounting means including a mounting stanchion projecting upwardly from said conductor, extension means on said vehicle connected to said stanchion at a location above said conductor to cause said edges to lie in a plane below and spaced from said extension means, and means above said conductor electrically insulating said conductor from said vehicle to prevent electrical current from flowing through said mounting means, said insulating means being provided between said extension means and said conductor by said stanchion with said stanchion being fabricated of an electrical insulation material.

7. Apparatus according to claim 6 wherein said insulation means includes a layer of insulation superimposed on said conductor and coextensive therewith.

8. Apparatus according to claim 7 including a wire depending through said insulation means from above said conductor for connecting said conductor in said circuit, and including means connecting said wire to the underside of said conductor.

9. Apparatus according to claim 8 wherein said stanchion is located inwardly of said edges and wherein said wire depends through said stanchion.

10. In combination with a self-propelled vehicle having a power source; means connected to said power source for cutting a swath of vegetation projecting upwardly from the ground; means for steering the vehicle in response to a signal; and means for guiding the vehicle automatically along the swath in the absense of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least two conductors mounted to said vehicle ahead of said cutting means, one conductor normally overlying the uncut vegetation and the other conductor normally spaced from cut vegetation in the swath, said circuit means being connected to said conductors so that when one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetation, the improvement comprising: an auxiliary conductor electrically connected with said one conductor in said circuit and spaced from said other conductor in the direction of movement of the vehicle, said auxiliary conductor cooperating with said one conductor to pass current through uncut vegetation for increasing the effective vegetation-seeking ability of the sensor means in the event that the vehicle advances through sparsely-growing vegetation, and said one conductor fails to pass current through uncut vegetation.

11. Apparatus according to claim 10 wherein said auxiliary conductor is located ahead of said other conductor and extends transversely to the path of movement of the vehicle.

12. Apparatus according to claim 10 wherein said other conductor includes front and rear sections spaced from one another in the direction of movement of the vehicle and means connecting said conductors in said circuit means to produce a signal for causing the vehicle to turn away from uncut vegetation only when both sections are passing current through uncut vegetation.

13. Apparatus according to claim 12 wherein said auxiliary conductor is located intermediate said sections.

14. Apparatus according to claim 10 wherein said conductors have edges confronting one another and extending in the direction of movement of the vehicle, and including means mounting said conductors to said vehicle to provide an air gap between said edges with said air gap having a widthwise dimension corresponding substantially to the widthwise dimension of said one conductor measured transversely to the path of movement of the vehicle.

15. Apparatus according to claim 14 wherein said dimension of said one conductor corresponds to the cutting width of said cutting means and is in a range of between 10–20% of the cutting width dimension.

16. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least two conductors mounted to said vehicle ahead of said cutting means, one conductor normally overlying the uncut vegetation and the other conductor normally spaced from cut vegetation in the swath, said circuit means being connected to said conductors so that when one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetation, the improvement comprising: time delay means connected in said circuit for preventing said vehicle from steering toward said uncut vegetation for a predetermined period of time after said one conductor ceases to pass current through uncut vegetation, said time delay means including means connected to said circuit means and operable in response to passage of current through uncut vegetation to store a charge of electrical energy and means cooperable with said storage means to prevent said signal from steering said vehicle until said charge dissipates.

17. Apparatus according to claim 16 wherein the magnitude of said predetermined time period is inversely related to the speed of the vehicle, with the length of the period being at a maximum when the speed of the vehicle is at a minimum.

18. Apparatus according to claim 17 wherein said vehicle has a speed in the range of 1.3 to 2.6 fps and said time delay is fixed at about 1 second.

19. Apparatus according to claim 16 including means connected in said circuit and to said vehicle power source to arrest motion of said vehicle if said one conductor does not pass current through uncut vegetation for a predetermined time period longer than said first period.

20. Apparatus according to claim 19 wherein said second time period is related to said first period by a factor of at least about 5/1.

21. Apparatus according to claim 18 wherein said vehicle has at least two driving wheels and said steering means includes a brake assembly associated with each driving wheel to brake the wheel in response to the steering signal supplied by the circuit means with said one conductor controlling one wheel and said other conductor controlling the other wheel, said means cooperable with said storage means preventing said steering signal from being supplied to said one wheel brake until said charge dissipates.

22. Apparatus according to claim 21 wherein said cooperable means includes means shunting said steering signal to said one wheel with said energy storage means being connected to said shunting means in said circuit to maintain said signal shunted for said period of time.

23. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least two conductors mounted to said vehicle ahead of said cutting means, one conductor normally overlying the uncut vegetation and the other conductor normally spaced from cut vegetation in the swath, said circuit means being connected to said conductors so that when one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetation, the improvement comprising: lockout means in said circuit cooperating with said conductors for preventing said other conductor from affecting the steering of said vehicle when said one conductor is not passing current through the uncut vegetation.

24. Apparatus according to claim 23 wherein said vehicle has at last two driving wheels and said steering means includes a brake assembly associated with each driving wheel to brake the wheel in response to the steering signal supplied by the circuit means with said one conductor controlling one wheel and said other conductor controlling the other wheel, said steering signal including a positive signal for actuating each brake assembly and said lockout means includes means to prevent a positive signal from being supplied to the brake of said other wheel when a positive signal is being supplied to the brake of said one wheel.

25. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least one conductor mounted to said vehicle ahead of said cutting means, and normally overlying the uncut vegetation with said circuit means being connected to said conductor so that when said one conductor passes current through uncut vegetation the vehicle travels in a straight path, the improvement comprising: means connecting said one conductor in said circuit and to said power source for interrupting said power source if said one conductor does not pass current through uncut vegetation for a predetermined period of time, so that the vehicle is not capable of traveling more than a predetermined distance in search of uncut vegetation after said one conductor ceases to pass current through uncut vegetation.

26. Apparatus according to claim 25 wherein said predetermined period of time corresponds to the length of time required for the vehicle to pivot through an arc of at least 180°.

27. Apparatus according to claim 25 wherein said predetermined period of time is at least about 5 seconds.

28. Apparatus according to claim 25 including at least another conductor mounted to said vehicle ahead of said cutting means, and normally spaced from cut vegetation in the swath, said circuit means being connected to said conductors so that when said one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetation, the improvement comprising: means connected with said other conductor in said circuit and to said power source to interrupt said power source when said other conductor passes current through uncut vegetation for more than a predetermined period of time.

29. Apparatus according to claim 28 wherein said predetermined period of time corresponds to the time required for the vehicle to pivot through an arc of at least 180°.

30. Apparatus according to claim 29 wherein said period of time is at least about 5 seconds.

31. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least two conductors mounted to said vehicle ahead of said cutting means, one conductor normally overlying the uncut vegetation and the other conductor normally spaced from cut vegetation in the swath, said circuit means being connected to said conductors so that when one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetationn, said vehicle including a pair of driving wheels connected to said power source and brake means associated with each wheel and responsive to a braking signal to stop said vehicle, the improvement comprising: means for arresting motion of the vehicle when said vehicle approaches an obstacle, said arresting means including switch means connected in said circuit for sending a braking signal simultaneously to both brake means for arresting forward motion of said vehicle substantially immediately upon contact of said switch means with the obstacle.

32. Apparatus according to claim 31 including means connecting said vehicle power source and said switch means in said circuit for interrupting power to the vehicle upon engagement of said switch means with the obstacle.

33. Apparatus according to claim 32 including means connected in said circuit to provide a time delay responsive to actuation of said switch means for causing said brakes to be engaged for a period of time at least as long as the period required for the power source and the cutting means to stop, whereby forward motion of the vehicle is arrested as inertia of the cutting means is being dissipated.

34. Apparatus according to claim 33 wherein said time delay means includes means for storing a charge of electricity upon actuation of said switch means, and means responsive to said charge to supply a braking signal to both of said brakes as the charge dissipates.

35. Apparatus according to claim 34 wherein said switch means includes a pressure-sensitive switch mounted transversely to the path of movement of said vehicle ahead of said cutting means.

36. Apparatus according to claim 34 wherein said switch means includes a conductive rod mounted to said vehicle and a wire disposed in a position as to be contacted by the rod so that motion of the vehicle is arrested when the rod contacts the wire.

37. Apparatus according to claim 36 including means connecting said wire to ground, means grounding said vehicle, and means connecting said rod in said circuit for stopping said engine and maintaining said engine stopped upon momentary contact of said rod with said wire.

38. Apparatus according to claim 37 wherein said rod projects upwardly from the vehicle and said wire surrounds the perimeter of an area of uncut vegetation at an elevation as to be contacted by the rod when the vehicle approaches the perimeter of the area.

39. In combination with a self-propelled vehicle having a power source; means connected to said power source for cutting a swath of vegetation projecting upwardly from the ground; means for steering the vehicle in response to a signal; and means for guiding the vehicle automatically along the swath in the absence of an operator, including sensor means carried on the vehicle for detecting the edge of the swath, circuit means connecting said sensor means and said steering means, a source of electrical energy connected in said circuit means and to said sensor means for passing electrical current through uncut vegetation, and amplifier means associated with said circuit means for producing the steering signal in response to said current, said sensor means including at least two conductors mounted to said vehicle ahead of said cutting means, one conductor normally overlying the uncut vegetation and the other conductor normally spaced from cut vegetation in th swath, said circuit means being connected to said conductors so that when one conductor passes current through uncut vegetation and the other does not the vehicle travels in a straight path, when both pass current through uncut vegetation the vehicle steers away from the uncut vegetation and when neither passes current through uncut vegetation the vehicle steers toward the uncut vegetation, a pair of driving wheels connected to said power source, and clutch-brake means associated with each driving wheel and responsive to said steering signal to steer the vehicle, and a handle mounted to said vehicle to afford manual steering of said vehicle, the improvement comprising: selector means having a manual and an automatic position and connected in said circuit for preventing steering signals from being supplied to said brakes when in said manual position while permitting said signals to be applied to said brakes when in said automatic position.

40. Apparatus according to claim 39 wherein said selector means includes means for inducing in said circuit a signal corresponding to the signal produced when said one conductor passes current through uncut vegetation.

41. Apparatus according to claim 39 including a drive shaft connected to each wheel and an input shaft connected to each clutch-brake assembly, each clutch-brake assembly having an output hub connected through the assembly to said input shaft and means connecting said output hub to its associated drive shaft to permit said drive shaft to overrun its respective input shaft when said vehicle is in its manual mode while preventing said drive shaft from overrunning its respective input shaft when said vehicle is in its automatic mode.

42. Apparatus according to claim 41 wherein said connecting means includes spline means connected to each drive shaft, a collar slidably connected to said hub for displacement axially of said shafts into and out of engagement with said spline means, and sprag clutch means connecting said collar to said drive shaft to permit said drive shaft to rotate in a forward direction relative to the collar when said collar is disengaged from its associated spline means.

43. Apparatus according to claim 42 including means to bias said collar into engagement with said spline means and retainer means for overcoming said bias to space said collar axially of spline means when said vehicle is in its manual operting mode.

\* \* \* \* \*